United States Patent
Kim et al.

(10) Patent No.: US 10,635,839 B2
(45) Date of Patent: Apr. 28, 2020

(54) FIXED-LOCATION IOT DEVICE FOR PROTECTING SECURE STORAGE ACCESS INFORMATION AND METHOD FOR PROTECTING SECURE STORAGE ACCESS INFORMATION OF FIXED-LOCATION IOT DEVICE

(71) Applicant: ELECTRONICS AND TELECOMMUNICATIONS RESEARCH INSTITUTE, Daejeon (KR)

(72) Inventors: Dae-Won Kim, Daejeon (KR); Young-Sae Kim, Daejeon (KR); Yong-Hyuk Moon, Daejeon (KR); Seung-Yong Yoon, Daejeon (KR); Jin-Hee Han, Daejeon (KR); Jae-Deok Lim, Sejong (KR); Jeong-Nyeo Kim, Daejeon (KR); Yong-Sung Jeon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 330 days.

(21) Appl. No.: 15/665,185

(22) Filed: Jul. 31, 2017

(65) Prior Publication Data
US 2018/0322314 A1    Nov. 8, 2018

(30) Foreign Application Priority Data
May 2, 2017    (KR) .................. 10-2017-0056544

(51) Int. Cl.
*G06F 21/78*    (2013.01)
*H04L 9/08*    (2006.01)
(Continued)

(52) U.S. Cl.
CPC ............ *G06F 21/78* (2013.01); *G06F 9/4401* (2013.01); *G06F 21/602* (2013.01);
(Continued)

(58) Field of Classification Search
CPC ..... H04W 12/04; H04W 12/06; H04W 12/08; H04W 12/12; H04W 4/023; H04W 4/50;
(Continued)

(56) References Cited

U.S. PATENT DOCUMENTS

| 2009/0024848 | A1* | 1/2009 | Takasugi | ............... H04L 9/3236 713/169 |
| 2009/0239500 | A1* | 9/2009 | Aripirala | ............... H04L 9/0891 455/410 |

(Continued)

FOREIGN PATENT DOCUMENTS

| KR | 10-2011-0037645 A | 4/2011 |
| KR | 10-2015-0095273 A | 8/2015 |
| KR | 10-2016-0112316 A | 9/2016 |

*Primary Examiner* — Shanto Abedin
*Assistant Examiner* — Adrian Stoica (57) ABSTRACT

Disclosed herein are a fixed-location Internet-of-Things (IoT) device for protecting secure storage access information and a method for protecting secure storage access information of the fixed-location IoT device. The fixed-location IoT device includes a unique hardware information analysis unit for generating a hardware hash value by analyzing unique hardware information corresponding to the fixed-location IoT device for protecting the secure storage access information, a network environment information collection unit for collecting network environment information from neighboring fixed-location IoT devices, a network environment information analysis unit for generating a network hash value by analyzing the network environment information, an access information encryption key generation unit for generating an access information encryption key corresponding to the secure storage access information
(Continued)

using the hardware hash value and the network hash value, and an encryption/decryption unit for encrypting or decrypting the secure storage access information using the access information encryption key.

19 Claims, 6 Drawing Sheets

(51) Int. Cl.
    *G06F 21/60*     (2013.01)
    *G06F 9/4401*     (2018.01)
    *H04W 4/70*     (2018.01)
    *H04L 29/06*     (2006.01)
    *H04L 29/08*     (2006.01)
(52) U.S. Cl.
    CPC .......... *H04L 9/0866* (2013.01); *H04L 9/0894* (2013.01); *H04L 63/0428* (2013.01); *H04L 63/06* (2013.01); *H04L 63/0876* (2013.01); *H04L 63/10* (2013.01); *H04W 4/70* (2018.02); *G06F 2221/2107* (2013.01); *H04L 67/10* (2013.01); *H04L 67/34* (2013.01); *H04L 2209/80* (2013.01)

(58) Field of Classification Search
    CPC ...... H04W 4/70; H04L 63/0428; H04L 63/06; H04L 63/0876; H04L 63/10; H04L 63/107; H04L 9/0816; H04L 9/0861; H04L 9/0866; H04L 9/0894; G06F 21/60; G06F 21/602; G06F 21/62; G06F 21/6218; G06F 21/70; G06F 21/78; G06F 21/79; G06F 21/80; G06F 9/44; G06F 9/4401; G06F 9/445
    See application file for complete search history.

(56) References Cited

U.S. PATENT DOCUMENTS

| | | | |
|---|---|---|---|
| 2010/0118734 A1* | 5/2010 | Weilnau, Jr. | ...... H04L 29/12358 370/254 |
| 2011/0126024 A1* | 5/2011 | Beatson | .................. G06F 21/32 713/186 |
| 2012/0163599 A1* | 6/2012 | Ware | ..................... H04W 12/08 380/270 |
| 2012/0166610 A1 | 6/2012 | Doh et al. | |
| 2015/0227755 A1 | 8/2015 | Lee et al. | |
| 2015/0365473 A1* | 12/2015 | Zuerner | .................. H04W 4/70 713/168 |
| 2016/0226831 A1 | 8/2016 | Kim et al. | |
| 2018/0191694 A1* | 7/2018 | Thiel | ...................... H04L 63/06 |

* cited by examiner

FIXED-LOCATION IOT DEVICE FOR PROTECTING SECURE STORAGE ACCESS INFORMATION AND METHOD FOR PROTECTING SECURE STORAGE ACCESS INFORMATION OF FIXED-LOCATION IOT DEVICE

CROSS REFERENCE TO RELATED APPLICATION

This application claims the benefit of Korean Patent Application No. 10-2017-0056544, filed May 2, 2017, which is hereby incorporated by reference in its entirety into this application.

BACKGROUND OF THE INVENTION

1. Technical Field

The present invention relates generally to a fixed-location Internet-of-Things (IoT) device and method for protecting access information for secure storage in an IoT environment.

2. Description of the Related Art

The term "Internet-of-Things (IoT) devices" denotes devices that are connected to each other over a wired/wireless network, regardless of the types and characteristics of devices, and that are then remotely controllable.

In relation to recent IoT markets, an Information Technology (IT) market research company predicted that the number of devices to be connected to the IoT will increase from five billion in 2015 to 25 billion in 2020. It is also expected that the number of various types of electronic devices and things that are influenced by the IoT will also increase, and that the number of things connected to and used over the Internet will be 10 billion in 2014 and 30 billion in 2020. Further, it is expected that the global IoT market will exhibit an annual average growth rate of 21.8% by 2022 and will grow to a size of 1.2 trillion dollars.

Further, with an increase in the scale of the IoT, it is predicted that damage attributable to security-related incidents resulting from the IoT will increase. It is predicted that the scale of the IoT security-related damage attributable to hacking or the like will increase from 13.4 trillion Won in 2015 to 26.7 trillion Won in 2030 (by Korea Institute for Industrial Economics and Technology (KIET), 2014), so that the requirement for security technology will increase, and thus security-related markets will be extended.

IoT devices may occasionally store sensitive information (or data) such as important information and security information. If such sensitive information is leaked due to remote hacking or offline access after a device has been stolen, various security threats may occur.

In order to protect sensitive information from such attacks, secure storage technology is generally used. As secure storage, there are an encrypted storage space, a secure zone storage space, an independent hardware security module, etc. Examples of the secure zone storage space include the case where a device is operated in the state in which the user environment of the device is separated into a non-secure zone and a secure zone.

In order to access original information in the secure storage, access information such as an encryption key or a password is required. In the case of a smart phone or a personal computer (PC), a user account, a password, etc. required in a login procedure may be used as secure storage access information.

However, in an IoT environment, the number of devices has increased to such an extent that a user or a manager cannot individually input access information. For example, when several hundreds to thousands of IoT devices installed in a smart building reboot due to a power failure, it is impossible for a person to input such access information.

If access information is stored in normal storage (non-secure zone) as plain text in order to automate this input procedure, the access information may be leaked to attackers via remote hacking or offline analysis based on device stealing.

That is, conventional technology has the following problems.

First, as the number of IoT devices increases exponentially in an IoT environment, it is very inefficient or impossible in practice for a person to individually input secure storage access information.

Second, if access information is stored in normal storage as plain text in order to automate this input procedure, the access information may be leaked to attackers via remote hacking or offline analysis based on device stealing.

Therefore, there is required a method for protecting secure storage access information for fixed-location IoT devices, such as a smart lamp, a smart doorbell, or a smart security camera, among IoT devices.

The above-described background technology is technological information that was possessed by the present applicant to devise the present invention or that was acquired by the present applicant during the procedure for devising the present invention, and thus it is impossible to necessarily refer to such information as known technology that was open to the public before the filing of the present invention.

PRIOR ART DOCUMENTS

Patent Documents (Patent Document 1) Korean Patent Application Publication No. 10-2016-0112316

SUMMARY OF THE INVENTION

Accordingly, the present invention has been made keeping in mind the above problems occurring in the prior art, and an object of the present invention is to provide a fixed-location IoT device and method for protecting access information for secure storage in an IoT environment, which protect sensitive information using information corresponding to neighboring fixed-location IoT devices.

In accordance with an aspect of the present invention to accomplish the above object, there is provided a fixed-location Internet of Things (IoT) device for protecting secure storage access information, including a unique hardware information analysis unit for generating a hardware hash value by analyzing unique hardware information corresponding to the fixed-location IoT device for protecting the secure storage access information; a network environment information collection unit for collecting network environment information from neighboring fixed-location IoT devices; a network environment information analysis unit for generating a network hash value by analyzing the network environment information; an access information encryption key generation unit for generating an access information encryption key corresponding to the secure storage access information using the hardware hash value and the network hash value; and an encryption/decryption unit for encrypting or decrypting the secure storage access information using the access information encryption key.

The network environment information collection unit may be configured to, when a boot state is an initial boot, collect initial network environment information from the neighboring fixed-location IoT devices a number of times identical to a preset first number of collections, the network environment information analysis unit may be configured to generate the network hash value by analyzing the initial network environment information, and the encryption/decryption unit may be configured to, when the boot state is the initial boot, encrypt the secure storage access information using the access information encryption key.

The network environment information collection unit may be configured to, when the boot state is not an initial boot, collect reboot network environment information from the neighboring fixed-location IoT devices a number of times identical to a preset second number of collections, the network environment information analysis unit may be configured to analyze the reboot network environment information, generate the network hash value when results of analysis of the reboot network environment information satisfy a preset analysis condition, and re-collect the reboot network environment information within a range of a preset allowable number of analysis failures when the results of analysis of the reboot network environment information do not satisfy the preset analysis condition, and the encryption/decryption unit may be configured to, when the boot state is not an initial boot and the results of analysis of the reboot network environment information satisfy the preset analysis condition, decrypt the secure storage access information using the access information encryption key.

The network environment information collection unit may be configured to, when collecting the initial network environment information and the reboot network environment information, transmit a speed measurement command to the neighboring fixed-location IoT devices and acquire pieces of identification information and response times corresponding to the respective neighboring fixed-location IoT devices from received response messages.

The network environment information collection unit may delete the initial network environment information and the reboot network environment information, except for preset deletion-exception items.

The network environment information analysis unit may extract significant figures and significant digits from the response times corresponding to the respective pieces of identification information and generate the network hash value using the significant figures.

The preset deletion-exception items may include the pieces of identification information and the significant digits.

The preset analysis condition may include a condition of comparing significant figures, extracted depending on the significant digits, from the response times corresponding to the respective pieces of identification information in the reboot network environment information.

The unique hardware information may include serial numbers of hardware components included in the fixed-location IoT device for protecting the secure storage access information.

In accordance with another aspect of the present invention to accomplish the above object, there is provided a method for protecting secure storage access information of a fixed-location IoT device, including generating a hardware hash value by analyzing unique hardware information corresponding to a target fixed-location IoT device including secure storage; when a boot state is an initial boot, collecting initial network environment information from neighboring fixed-location IoT devices a number times corresponding to a preset first number of collections; generating a network hash value by analyzing the initial network environment information; generating an access information encryption key corresponding to secure storage access information using the hardware hash value and the network hash value; and encrypting the secure storage access information using the access information encryption key.

The method may further include, when the boot state is not an initial boot, collecting reboot network environment information from the neighboring fixed-location IoT devices a number of times identical to a preset second number of collections; analyzing the reboot network environment information and generating the network hash value when results of analysis of the reboot network environment information satisfy a preset analysis condition; and decrypting the secure storage access information using the access information encryption key when the results of analysis of the reboot network environment information satisfy the preset analysis condition, wherein when the reboot network environment information is analyzed and the results of analysis of the reboot network environment information do not satisfy the preset analysis condition, repeating collecting the reboot network environment information within a range of a preset allowable number of analysis failures.

Collecting the initial network environment information may be configured to transmit a speed measurement command to the neighboring fixed-location IoT devices and acquire pieces of identification information and response times corresponding to the respective neighboring fixed-location IoT devices from received response messages, and collecting the reboot network environment information may be configured to transmit a speed measurement command to the neighboring fixed-location IoT devices and acquire pieces of identification information and response times corresponding to the respective neighboring fixed-location IoT devices from received response messages.

The method may further include deleting the initial network environment information and the reboot network environment information, except for preset deletion-exception items.

Generating the network hash value may be configured to extract significant figures and significant digits from the response times corresponding to the respective pieces of identification information and generate the network hash value using the significant figures.

The preset deletion-exception items may include the pieces of identification information and the significant digits.

The preset analysis condition may include a condition of comparing significant figures, extracted depending on the significant digits, from the response times corresponding to the respective pieces of identification information in the reboot network environment information.

The unique hardware information may include serial numbers of hardware components included in the target fixed-location IoT device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings. The advantages and features of the present invention and methods for achieving them will be more clearly understood from the following detailed description taken in conjunction with the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

However, the present invention is not limited to the following embodiments, but some or all of the following embodiments can be selectively combined and configured so that various modifications are possible. In the following embodiments, terms such as "first" and "second" are not intended to restrict the meanings of components and are merely intended to distinguish one component from other components. A singular expression includes a plural expression unless a description to the contrary is specifically pointed out in context. In the present specification, it should be understood that the terms such as "include" or "have" are merely intended to indicate that features or components described in the present specification are present, and are not intended to exclude the possibility that one or more other features or components will be present or added.

Embodiments of the present invention will be described in detail with reference to the accompanying drawings. In the following description of the present invention, the same reference numerals are used to designate the same or similar elements throughout the drawings, and repeated descriptions of the same components will be omitted.

Figure 1:
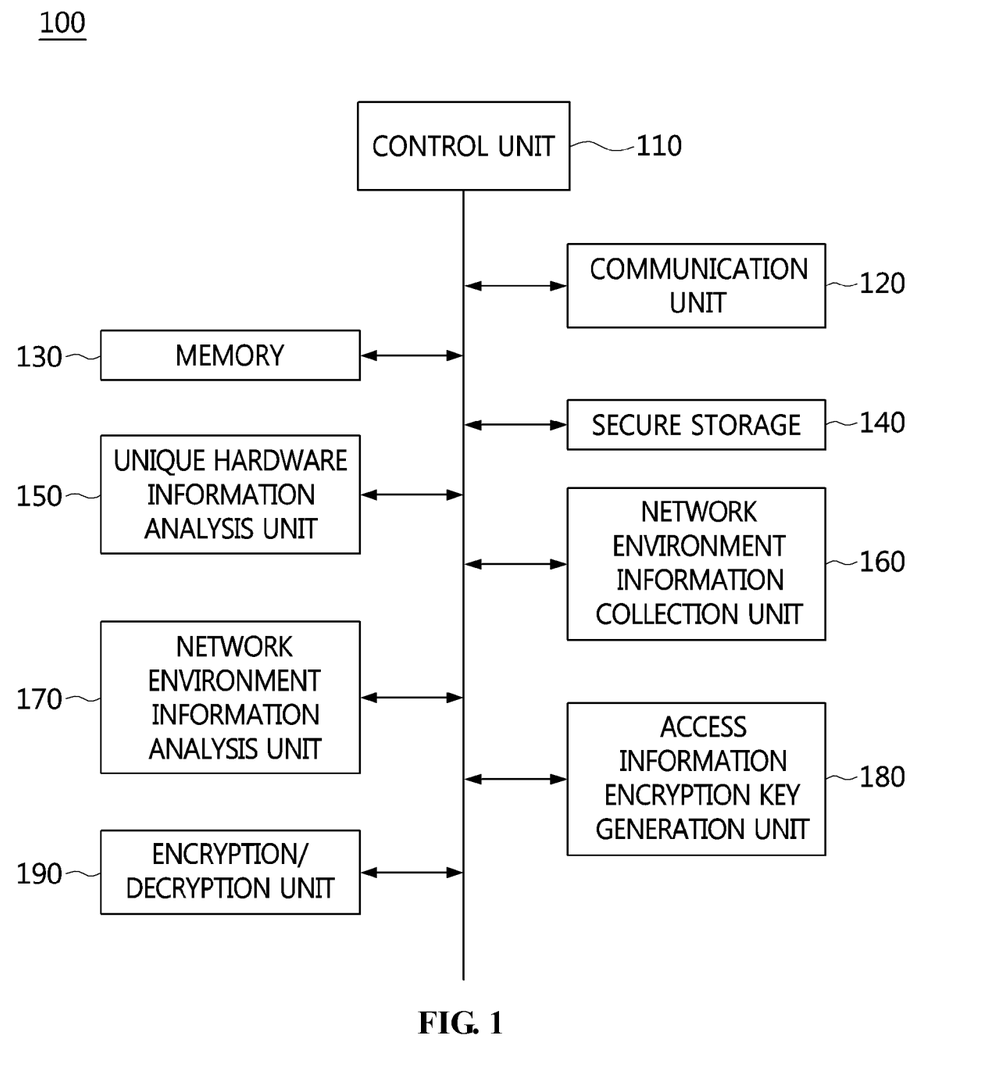
FIG. 1 is a diagram illustrating the configuration of a fixed-location IoT device for protecting secure storage access information according to an embodiment of the present invention.

FIG. 1 is a diagram illustrating the configuration of a fixed-location IoT device 100 for protecting secure storage access information according to an embodiment of the present invention.

Referring to FIG. 1, the fixed-location IoT device 100 for protecting secure storage access information according to an embodiment of the present invention includes a control unit 110, a communication unit 120, memory 130, secure storage 140, a unique hardware information analysis unit 150, a network environment information collection unit 160, a network environment information analysis unit 170, an access information encryption key generation unit 180, and an encryption/decryption unit 190.

In detail, the control unit 110, which is a kind of Central Processing Unit (CPU), controls the overall process performed by the fixed-location IoT device for protecting secure storage access information. That is, the control unit 110 may provide various types of functions by controlling the unique hardware information analysis unit 150, the network environment information collection unit 160, the network environment information analysis unit 170, the access information encryption key generation unit 180, and the encryption/decryption unit 190.

Here, the control unit 110 may include all types of devices capable of processing data, such as a processor. Here, the term "processor" may refer to a data-processing device that has a physically structured circuit to perform functions represented by code or instructions included in a program and that is embedded in hardware. In this way, examples of the data-processing device embedded in hardware may include, but are not limited to, processing devices such as a microprocessor, a CPU, a processor core, a multiprocessor, an Application-Specific Integrated Circuit (ASIC), and a Field Programmable Gate Array (FPGA).

The communication unit 120 provides a communication interface required in order to transmit transmission/reception signals between the fixed-location IoT device 100 for protecting secure storage access information and neighboring fixed-location IoT devices.

Here, the communication unit 120 may be a device including hardware and software required in order to transmit/receive signals, such as control signals or data signals, to/from other network devices through wired/wireless connection.

The memory 130 functions to temporarily or permanently store data processed by the control unit 110. Here, the memory 130 may include, but is not limited to, magnetic storage media or flash storage media.

The secure storage 140 stores sensitive information including important information or security information in the fixed-location IoT device 100 for protecting secure storage access information.

Here, the secure storage 140 may be composed of an encrypted storage space, a secure zone storage space, an independent hardware security module, etc.

The unique hardware information analysis unit 150 analyzes unique hardware information corresponding to the fixed-location IoT device for protecting secure storage access information, and then generates a hardware hash value.

Here, the unique hardware information may include the serial numbers of respective hardware components included in the fixed-location IoT device for protecting secure storage access information.

Here, hash values may be generated for respective serial numbers of the hardware components, and a hardware hash value may be generated using the generated hash values.

Here, the hardware hash value may be generated by performing operations, such as AND, OR, or Exclusive-OR (XOR) operations, in combination on the hash values corresponding to respective serial numbers of the hardware components.

The hardware components may include the control unit 110 corresponding to a CPU, the communication unit 120 corresponding to a network device, the memory 130, etc.

The network environment information collection unit 160 collects network environment information corresponding to neighboring fixed-location IoT devices.

When collecting initial network environment information and reboot network environment information, the network environment information collection unit 160 may transmit a communication speed measurement command to the neighboring fixed-location IoT devices, and may acquire pieces of identification information and response times corresponding to respective neighboring fixed-location IoT devices from response messages received from the neighboring fixed-location IoT devices.

The pieces of identification information may contain the Media Access Control (MAC) addresses of communication units included in the respective neighboring fixed-location IoT devices.

Here, the response times may be collected for respective pieces of identification information, as in the example shown in the following Table 1.

TABLE 1

| Neighboring device | Identification information | First measurement value | Second measurement value | ... | N-th measurement value |
|---|---|---|---|---|---|
| Device 1 | 1.1.10 | 10.107 | 10.127 | ... | 10.159 |
| Device 2 | 1.1.15 | 12.123 | 12.245 | ... | 12.579 |
| Device 3 | 1.1.8 | 16.237 | 16.576 | ... | 16.709 |

Referring to Table 1, identification information corresponding to a neighboring fixed-location IoT device 1 is 1.1.10, and network environment information is collected N times for each device.

Here, "response time" may denote the time required to send a speed measurement request and to receive a response message, wherein the unit of the response time may be any of various units, such as milliseconds or microseconds.

When a boot state is an initial boot of the fixed-location IoT device for protecting secure storage access information, the network environment information collection unit 160 may collect initial network environment information from the neighboring fixed-location IoT devices a number of times identical to the preset first number of collections.

Here, when the boot state is not an initial boot of the fixed-location IoT device for protecting secure storage access information, the network environment information collection unit 160 may collect reboot network environment information from the neighboring fixed-location IoT devices a number of times identical to the preset second number of collections.

Here, the reason for separating the case of the initial boot from the remaining case other than the initial boot is to determine whether access information for the secure storage 140 is currently being protected.

Here, a determination as to whether the boot state is the initial boot may be realized in various manners using the storage of environmental variables or the like.

The preset second number of collections may be set to a value less than the preset first number of collections.

When collecting the reboot network environment information, the network environment information collection unit 160 may collect response times only for pieces of registered device identification information from the initial network environment information.

Here, the network environment information collection unit 160 may delete the initial network environment information and the reboot network environment information, except for preset deletion-exception items, in order to improve security.

The preset deletion-exception items may include identification information and significant digits.

The network environment information analysis unit 170 may generate a network hash value by analyzing the collected network environment information.

Here, the network environment information analysis unit 170 may generate the network hash value by analyzing the initial network environment information.

As shown in the following Table 2, the network environment information analysis unit 170 may extract significant figures (numbers) and significant digits from the response times corresponding to respective pieces of identification information, and may generate the network hash value using the significant figures.

TABLE 2

| Identification information | First measurement value | Second measurement value | ... | N-th measurement value | Significant FIG. | Significant digit |
|---|---|---|---|---|---|---|
| 1.1.10 | 10.107 | 10.127 | ... | 10.159 | 10.1 | 3 |
| 1.1.15 | 12.123 | 12.245 | ... | 12.579 | 12 | 2 |
| 1.1.8 | 16.237 | 16.576 | ... | 16.709 | 16 | 2 |

Table 2 shows the extraction of significant figures and significant digits in relation to the example of Table 1. It can be seen in Table 2 that the significant digit corresponding to identification information 1.1.10 is 3, and the significant figure corresponding to the identification information is 10.1.

The network environment information analysis unit 170 may analyze the reboot network environment information and may generate a network hash value if the results of analysis of the reboot network environment information satisfy a preset analysis condition, and may prompt the network environment information collection unit 160 to re-collect reboot network environment information within the range of the preset allowable number of analysis failures if the results of analysis of the reboot network environment information do not satisfy the preset analysis condition.

Here, the network hash value may be generated by performing operations, such as addition, subtraction, or multiplication, in combination on the significant figures corresponding to respective pieces of identification information.

When the preset allowable number of analysis failures is exceeded, the network environment information analysis unit 170 prevents the network environment information collection unit 160 from collecting additional reboot network environment information, and thus neither a network hash value nor an access information encryption key is generated. Therefore, the fixed-location IoT device is operated without the decryption of the secure storage access information being performed.

Here, the preset analysis condition may include information indicating whether extracted significant figures are identical to each other for respective pieces of identification information when significant figures are extracted from response times included in the reboot network environment information depending on the significant digits corresponding to respective pieces of identification information.

TABLE 3

| Identification information | Significant digit | First measurement value | Second measurement value | ... | M-th measurement value | Identicalness or non-identicalness |
|---|---|---|---|---|---|---|
| 1.1.10 | 3 | 10.174 | 10.135 | ... | 10.191 | ○ |
| 1.1.15 | 2 | 12.623 | 12.363 | ... | 12.592 | ○ |
| 1.1.8 | 2 | 16.432 | 16.236 | ... | 16.599 | ○ |

Table 3 shows an example in which reboot network environment information satisfying the preset analysis condition in the example of Table 2 is collected, wherein the network environment information is collected M times for each device. Here, the significant digits are extracted from the initial network environment information of Table 2. Therefore, in this case, the network hash value may be generated using the collected reboot network environment information.

TABLE 4

| Identification information | Significant digit | First measurement value | Second measurement value | ... | M-th measurement value | Identicalness or non-identicalness |
|---|---|---|---|---|---|---|
| 1.1.10 | 3 | 10.174 | 10.135 | ... | 10.191 | X |
| 1.1.15 | 2 | 11.933 | 12.363 | ... | 12.592 | X |
| 1.1.8 | 2 | 17.021 | 16.236 | ... | 16.599 | ○ |

Table 4 shows an example in which reboot network environment information that does not satisfy the preset analysis condition in the example of Table 2 is collected, wherein the network environment information is collected M times for each device. Here, the significant digits are extracted from the initial network environment information of Table 2. In this case, if the network hash value is not generated using the collected reboot network environment information and the number of analysis failures does not reach the preset allowable number of analysis failures, reboot network environment information may be re-collected and then analyzed.

Here, the preset analysis condition may include a condition indicating whether a response time has exceeded a preset response time limit or a condition indicating whether a response message has been received within the preset response time limit.

The access information encryption key generation unit 180 generates an access information encryption key corresponding to the secure storage access information using both the hardware hash value and the network hash value.

Here, the access information encryption key may be generated by performing operations, such as AND, OR, or XOR operations, in combination on the hardware hash value and the network hash value.

The encryption/decryption unit 190 encrypts or decrypts the secure storage access information using the access information encryption key.

Here, when the boot state is an initial boot of the fixed-location IoT device for protecting secure storage access information, the encryption/decryption unit 190 may encrypt the secure storage access information using the access information encryption key.

When the boot state is not an initial boot of the fixed-location IoT device for protecting secure storage access information, the encryption/decryption unit 190 may decrypt the secure storage access information using the access information encryption key.

Accordingly, the present invention may automatically encrypt and decrypt secure storage access information using the information of neighboring fixed-location IoT devices. Therefore, by means of this automatic encryption/decryption, even if the scale of an IoT system is increased, secure storage access information may be easily and securely processed.

Further, the generated encryption key is not directly used as the secure storage access information. Therefore, even if a communication environment is changed, only access information is decrypted, and may then be re-encrypted using a new encryption key. Furthermore, since the present invention is less dependent on secure storage technology, various types of secure storage technologies may be supported.

Figure 2:
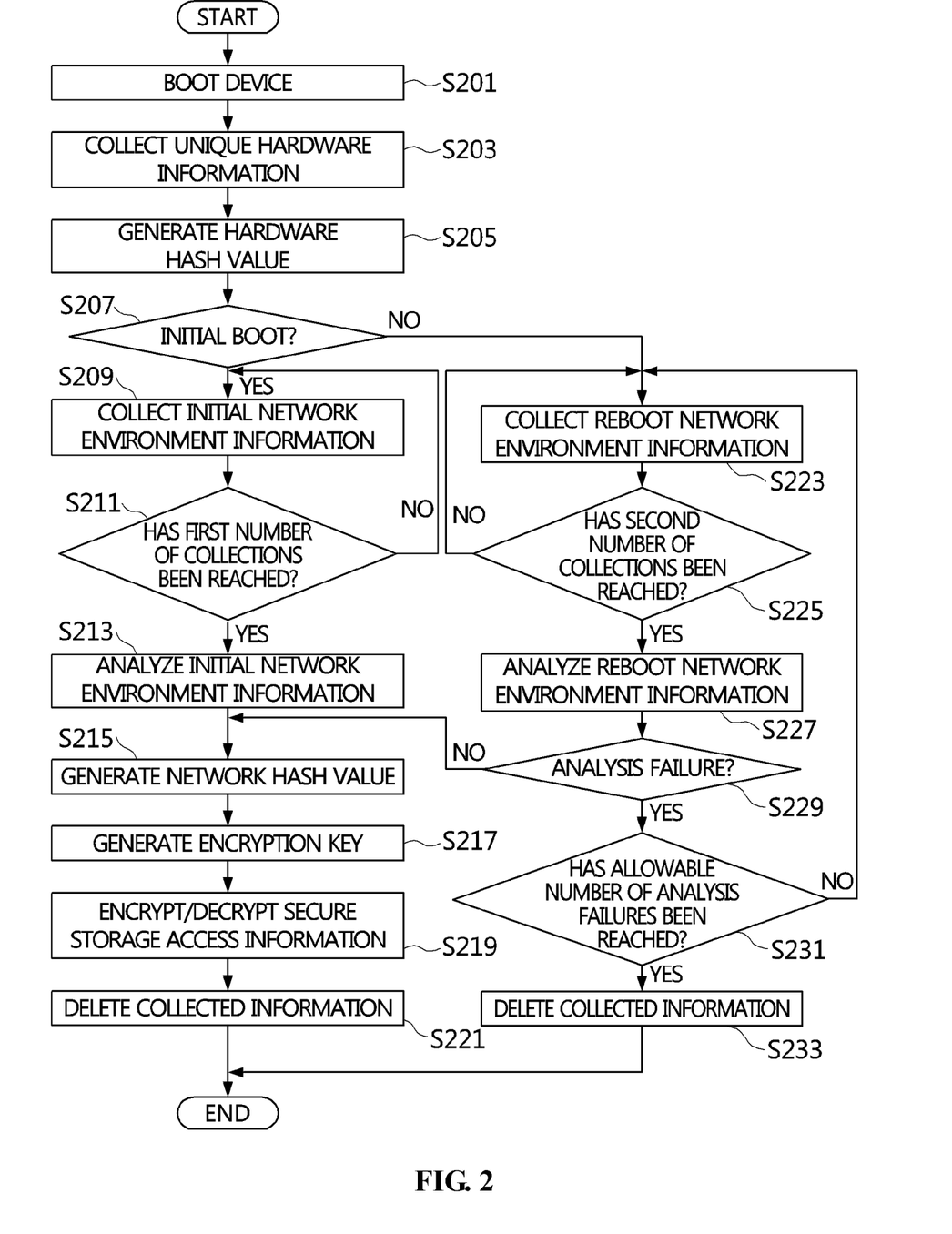
FIG. 2 is an operation flowchart illustrating a method for protecting secure storage access information of a fixed-location IoT device according to an embodiment of the present invention.

FIG. 2 is an operation flowchart illustrating a method for protecting secure storage access information of the fixed-location IoT device according to an embodiment of the present invention.

Referring to FIG. 2, in the method for protecting secure storage access information of the fixed-location IoT device according to the embodiment of the present invention, the fixed-location IoT device for protecting secure storage access information boots a target fixed-location IoT device that includes secure storage at step S201.

Here, the secure storage may store pieces of sensitive information including important information or security information in the target fixed-location IoT device, and may be composed of an encrypted storage space, a secure zone storage space, an independent hardware security module, etc.

Further, as the target fixed-location IoT device boots, an encryption key generation procedure for encrypting or decrypting secure storage access information required to access the secure storage is initiated.

Then, in the method for protecting secure storage access information of the fixed-location IoT device according to the embodiment of the present invention, the fixed-location IoT device for protecting secure storage access information collects unique hardware information corresponding to the target fixed-location IoT device at step S203.

Here, the collected unique hardware information may include the serial numbers of respective hardware components included in the target fixed-location IoT device.

Further, in the method for protecting secure storage access information of the fixed-location IoT device according to the embodiment of the present invention, the fixed-location IoT device for protecting secure storage access information generates a hardware hash value by analyzing the unique hardware information at step S205.

Here, hash values may be generated for respective collected serial numbers of the hardware components, and the hardware hash value may be generated using the generated hash values.

In this case, the hardware hash value may be generated by performing operations, such as AND, OR, or XOR operations, in combination on the hash values corresponding to respective serial numbers of the hardware components.

Then, in the method for protecting secure storage access information of the fixed-location IoT device according to the embodiment of the present invention, the fixed-location IoT device for protecting secure storage access information determines whether the boot state of the target fixed-location IoT device is an initial boot or a reboot at step S207.

Here, the reason for separating the case of the initial boot from the remaining case other than the initial boot is to determine whether access information for the secure storage of the target fixed-location IoT device is currently being protected.

Here, a determination as to whether the boot state is an initial boot may be implemented in various manners using the storage of environmental variables or the like.

As a result of the determination at step S207, if the boot state of the target fixed-location IoT device is the initial boot, initial network environment information is collected from neighboring fixed-location IoT devices a number of times identical to the preset first number of collections at steps S209 and S211.

Here, when the initial network environment information is collected, a communication speed measurement command is transmitted to the neighboring fixed-location IoT devices, and pieces of identification information and response times corresponding to the respective neighboring fixed-location IoT devices may be acquired from response messages received from the neighboring fixed-location IoT devices.

Here, the pieces of identification information may contain the MAC addresses or the like of communication units included in the respective neighboring fixed-location IoT devices.

Here, "response time" may denote the time required to send a speed measurement request and to receive a response message, wherein the unit of the response time may be any of various units, such as milliseconds or microseconds.

Further, in the method for protecting secure storage access information of the fixed-location IoT device according to the embodiment of the present invention, the fixed-location IoT device for protecting secure storage access information analyzes the collected initial network environment information at step S213.

Here, significant figures and significant digits may be extracted from response times corresponding to respective pieces of identification information in the initial network environment information.

Next, in the method for protecting secure storage access information of the fixed-location IoT device according to the embodiment of the present invention, the fixed-location IoT device for protecting secure storage access information generates a network hash value using the analyzed initial network environment information at step S215.

Here, the network hash value may be generated by performing operations, such as addition, subtraction, or multiplication, in combination on the significant figures corresponding to respective pieces of identification information.

Then, in the method for protecting secure storage access information of the fixed-location IoT device according to the embodiment of the present invention, the fixed-location IoT device for protecting secure storage access information generates an access information encryption key corresponding to the secure storage access information using the network hash value at step S217.

Here, the access information encryption key may be generated by performing operations, such as AND, OR, or XOR operations, in combination on the hardware hash value and the network hash value.

Further, in the method for protecting secure storage access information of the fixed-location IoT device according to the embodiment of the present invention, the fixed-location IoT device for protecting secure storage access information encrypts or decrypts the secure storage access information using the access information encryption key at step S219.

Here, when the boot state of the target fixed-location IoT device is an initial boot, the secure storage access information may be encrypted, whereas when the boot state of the target fixed-location IoT device is not an initial boot, the secure storage access information may be decrypted.

Next, in the method for protecting secure storage access information of the fixed-location IoT device according to the embodiment of the present invention, the fixed-location IoT device for protecting secure storage access information deletes the collected network environment information, except for preset deletion-exception items, at step S221.

The preset deletion-exception items may include identification information and significant digits.

Here, as the collected network environment information is deleted, analysis by an attacker may be prevented, thus enabling security to be improved.

On the other hand, as a result of the determination at step S207, if the boot state of the target fixed-location IoT device is not an initial boot, the fixed-location IoT device for protecting secure storage access information collects reboot network environment information from the neighboring fixed-location IoT devices a number of times identical to the preset second number of collections at steps S223 and S225.

Here, the preset second number of collections may be set to a value less than the preset first number of collections.

Here, when the reboot network environment information is collected, response times may be collected only for pieces of registered device identification information from the initial network environment information.

Next, in the method for protecting secure storage access information of the fixed-location IoT device according to the embodiment of the present invention, the fixed-location IoT device for protecting secure storage access information analyzes the collected reboot network environment information at step S227.

Thereafter, in the method for protecting secure storage access information of the fixed-location IoT device according to the embodiment of the present invention, the fixed-location IoT device for protecting secure storage access information determines whether the results of analysis of the reboot network environment information satisfy a preset analysis condition at step S229.

Here, the preset analysis condition may include information indicating whether extracted significant figures are identical to each other for respective pieces of identification information when significant figures are extracted from response times included in the reboot network environment information depending on the significant digits corresponding to respective pieces of identification information. Here, the significant digits may be extracted from the initial network environment information.

Here, the preset analysis condition may include a condition indicating whether a response time has exceeded a preset response time limit or a condition indicating whether a response message has been received within the preset response time limit.

If it is determined at step S229 that the results of analysis of the reboot network environment information satisfy the preset analysis condition, the process returns to step S215, where a network hash value is generated.

That is, when the reboot network environment information is analyzed and the results of the analysis satisfy the preset analysis condition, the network hash value is generated, and an access information encryption key is generated using both the hardware hash value and the network hash value.

If it is determined at step S229 that the results of analysis of the reboot network environment information do not satisfy the preset analysis condition, it is determined whether the number of cases where the analysis condition is not satisfied has reached the preset allowable number of analysis failures at step S231.

If it is determined at step S231 that the number of cases where the analysis condition is not satisfied has not reached the preset allowable number of analysis failures, the process returns to step S223, and then reboot network environment information is re-collected from the neighboring fixed-location IoT devices a number of times identical to the preset second number of collections at steps S223 and S225.

That is, if a network hash value is not generated using the collected reboot network environment information and the number of cases where the analysis condition is not satisfied has not reached the preset allowable number of analysis failures, reboot network environment information may be re-collected and then analyzed.

If it is determined at step S231 that the number of cases where the analysis condition is not satisfied has reached the preset allowable number of analysis failures, the collected network environment information is deleted at step S233.

That is, when the number of cases where the analysis condition is not satisfied has exceeded the preset allowable number of analysis failures, additional reboot network environment information is not collected, and thus neither a network hash value nor an access information encryption key is generated. Therefore, the fixed-location IoT device is operated without the decryption of the secure storage access information being performed.

Accordingly, the present invention may automatically encrypt and decrypt secure storage access information using the information of neighboring fixed-location IoT devices. Therefore, by means of this automatic encryption/decryption, even if the scale of an IoT system is increased, secure storage access information may be easily and securely processed.

Further, the generated encryption key is not directly used as the secure storage access information. Therefore, even if a communication environment is changed, only access information is decrypted and may then be re-encrypted using a new encryption key. Furthermore, since the present invention is less dependent on secure storage technology, various types of secure storage technologies may be supported.

Figure 3:
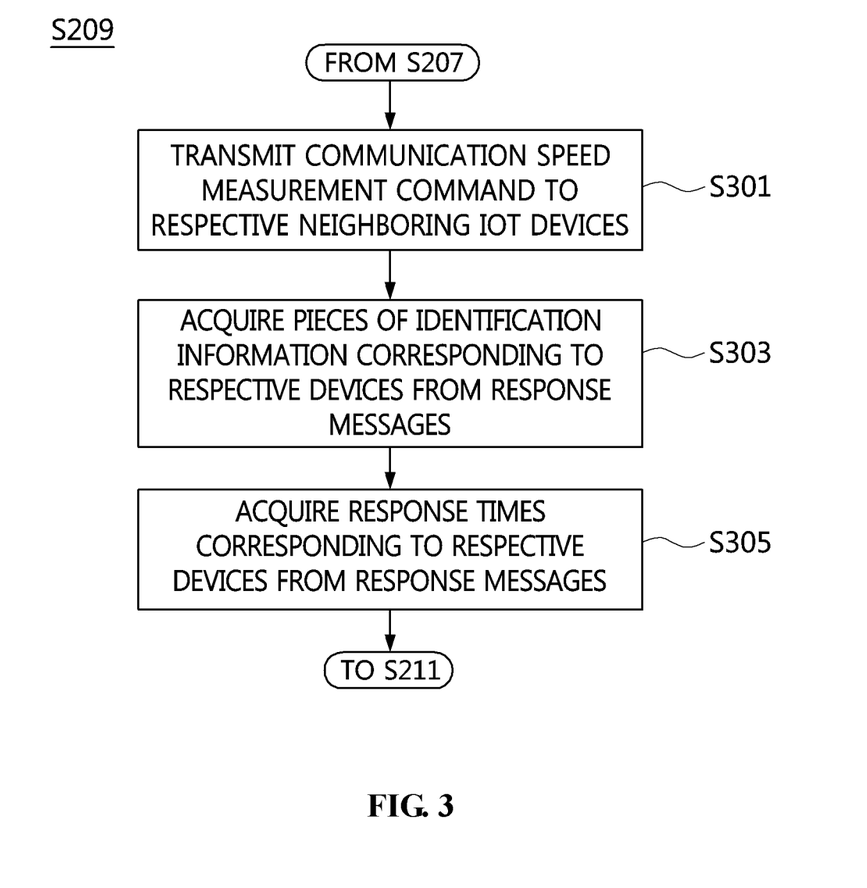
FIG. 3 is an operation flowchart illustrating an example of the step of collecting initial network environment information, illustrated in FIG. 2.

FIG. 3 is an operation flowchart illustrating an example of the step S209 of collecting initial network environment information, illustrated in FIG. 2.

Referring to FIG. 3, at the step S209 of collecting the initial network environment information, illustrated in FIG. 2, a communication speed measurement command is transmitted to individual neighboring fixed-location IoT devices at step S301.

Further, at the step S209 of collecting the initial network environment information, illustrated in FIG. 2, pieces of identification information corresponding to respective neighboring fixed-location IoT devices are acquired from response messages sent from the neighboring fixed-location IoT devices at step S303.

Here, the pieces of identification information may contain the MAC addresses or the like of communication units included in the respective neighboring fixed-location IoT devices.

Then, at the step S209 of collecting the initial network environment information, illustrated in FIG. 2, response times corresponding to respective neighboring fixed-location IoT devices are acquired from the response messages sent from the neighboring fixed-location IoT devices at step S305.

Here, "response time" may denote the time required to send a speed measurement request and to receive a response message, wherein the unit of the response time may be any of various units, such as milliseconds or microseconds.

Accordingly, the neighboring fixed-location IoT devices are classified based on the identification information, and the response times are collected, and thus the neighboring network environment information of the target fixed-location IoT device may be reflected at high accuracy.

In a selective embodiment, among steps S301, S303 and S305, the step S303 of acquiring the identification information and the step S305 of acquiring the response times may be performed in parallel.

Figure 4:
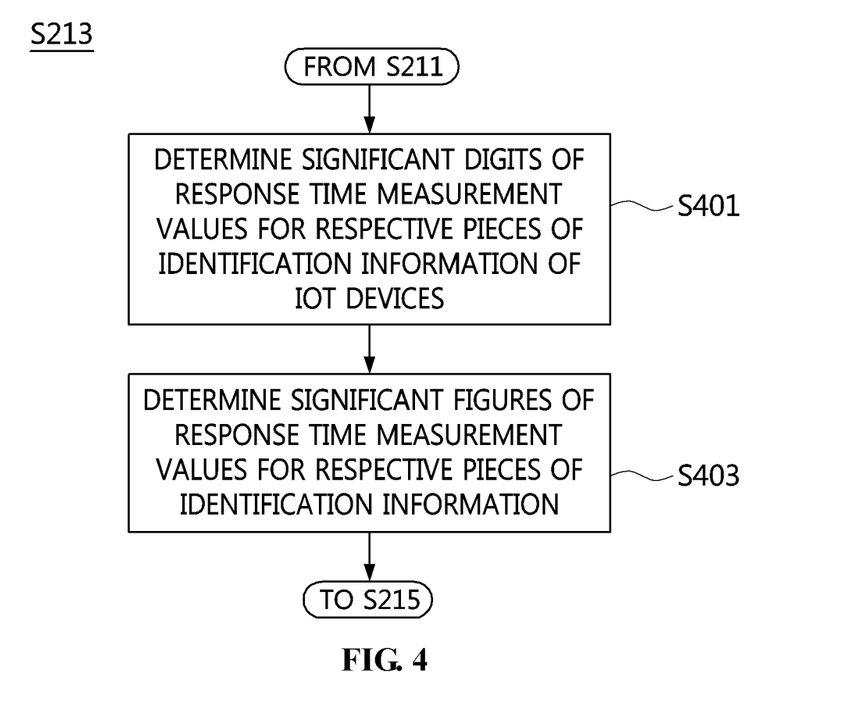
FIG. 4 is an operation flowchart illustrating an example of the step of analyzing initial network environment information, illustrated in FIG. 2.

FIG. 4 is an operation flowchart illustrating an example of the step S213 of analyzing the initial network environment information, illustrated in FIG. 2.

Referring to FIG. 4, at step S213 of analyzing the initial network environment information, illustrated in FIG. 2, significant digits of response time measurement values are determined for respective pieces of identification information of the neighboring fixed-location IoT devices at step S401.

Further, at the step S213 of analyzing the initial network environment information, illustrated in FIG. 2, significant figures of the response time measurement values are determined for respective pieces of identification information of the neighboring fixed-location IoT devices at step S403.

Accordingly, even if network environment information is collected from the neighboring fixed-location IoT devices at subsequent reboot, identical response times within the significant figures may be acquired.

In a selective embodiment, when steps S401 and S403 are performed, the step S401 of determining the significant digits and the step S403 of determining the significant figures may be performed in parallel.

In a selective embodiment, when steps S401 and S403 are performed, the step S403 of determining significant figures may be performed first, and then the step S401 of determining significant digits may be performed.

Figure 5:
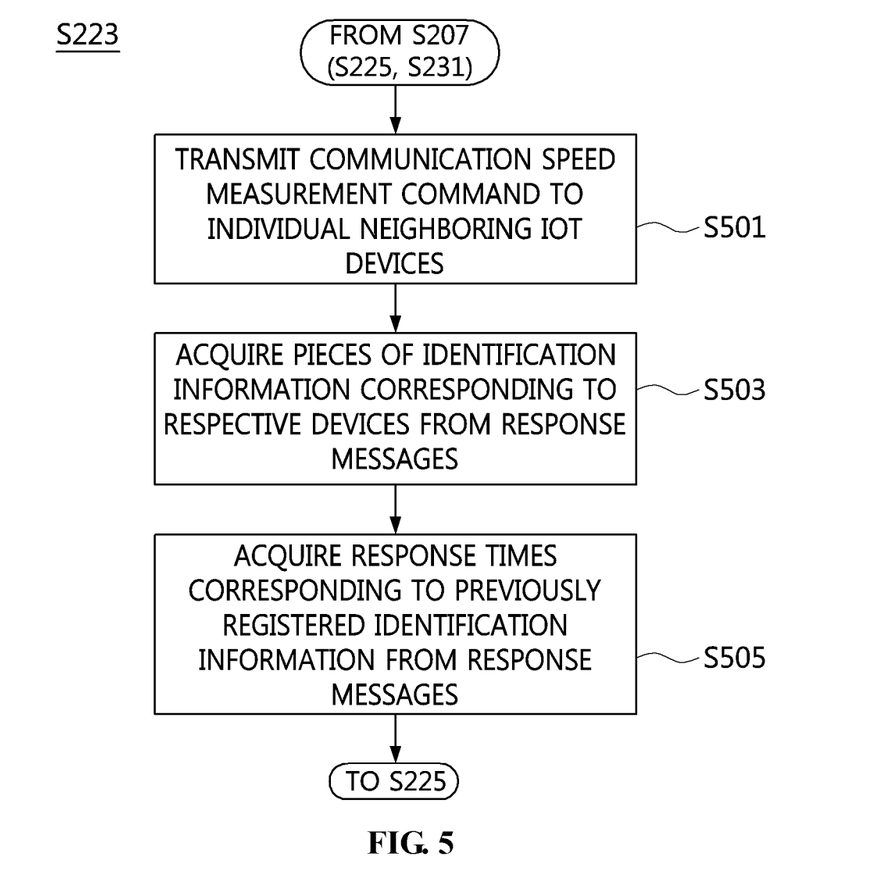
FIG. 5 is an operation flowchart illustrating an example of the step of collecting reboot network environment information, illustrated in FIG. 2.

FIG. 5 is an operation flowchart illustrating an example of the step S223 of collecting the reboot network environment information, illustrated in FIG. 2.

Referring to FIG. 5, at the step S223 of collecting the reboot network environment information, illustrated in FIG. 2, a communication speed measurement command is transmitted to individual neighboring fixed-location IoT devices at step S501.

Further, at the step S223 of collecting the reboot network environment information, illustrated in FIG. 2, pieces of identification information corresponding to respective neighboring fixed-location IoT devices are acquired from response messages sent from the neighboring fixed-location IoT devices at step S503.

Here, the pieces of identification information may contain the MAC addresses or the like of communication units included in the respective neighboring fixed-location IoT devices.

Then, at the step S223 of collecting the reboot network environment information, illustrated in FIG. 2, response times corresponding to the previously registered identification information are acquired from the response messages sent from the neighboring fixed-location IoT devices at step S505.

Here, "response time" may denote the time required to send a speed measurement request and to receive a response message, wherein the unit of the response time may be any of various units, such as milliseconds or microseconds.

Accordingly, of the reboot network environment information, only response times corresponding to pieces of identification information contained in the initial network environment information are collected. As a result, even if a new fixed-location IoT device is added, the identical access information encryption key may be generated when the target fixed-location IoT device reboots.

In a selective embodiment, among steps S501, S503, and S505, the step S503 of acquiring the pieces of identification information and the step S505 of acquiring the response times may be performed in parallel.

Figure 6:
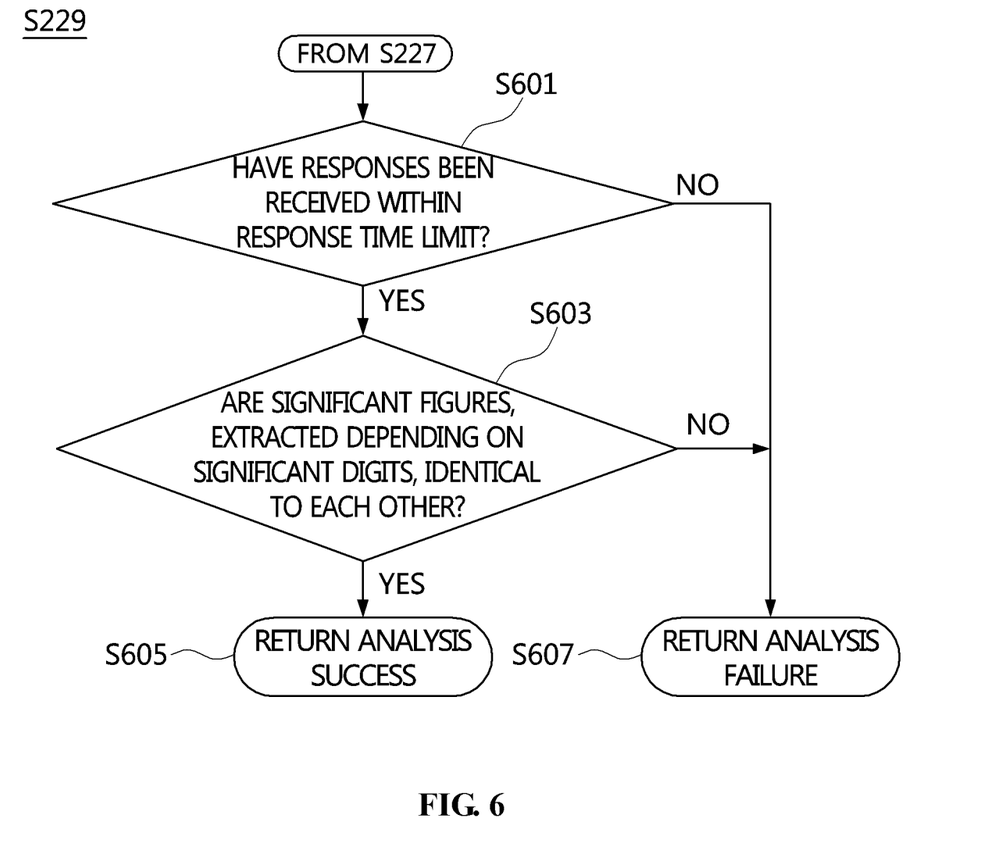
FIG. 6 is an operation flowchart illustrating an example of the step of determining whether an analysis condition is satisfied, illustrated in FIG. 2.

FIG. 6 is an operation flowchart illustrating an example of the step S229 of determining whether the analysis condition is satisfied, illustrated in FIG. 2.

Referring to FIG. 6, at the step S229 of determining whether the analysis condition is satisfied, illustrated in FIG. 2, it is determined whether response messages have been received from neighboring fixed-location IoT devices within a response time limit at step S601.

If it is determined at step S601 that response messages have not been received within the response time limit, an analysis failure response attributable to the dissatisfactory nature of the analysis condition is returned at step S607.

If it is determined at step S601 that the response messages have been received within the response time limit, significant figures are extracted from the response times included in the reboot network environment information depending on significant digits corresponding to respective pieces of identification information, and it is determined whether the extracted significant figures are identical to each other for respective pieces of identification information at step S603.

If it is determined at step S603 that the extracted significant figures are not identical to each other for respective pieces of identification information, an analysis failure response attributable to the dissatisfactory nature of the analysis condition is returned at step S607.

Further, if it is determined at step S603 that the extracted significant figures are identical to each other for respective pieces of identification information, an analysis success response attributable to the satisfactory nature of the analysis condition is returned at step S605.

Accordingly, the reboot network environment information may be compared with the initial network environment information, and thus identicalness therebetween may be determined with high reliability.

In a selective embodiment, among steps S601, S603, S605, and S607, the step S601 of determining whether responses have been received within the response time limit and the step S603 of determining whether the extracted significant figures are identical to each other may be performed in parallel.

In a selective embodiment, among steps S601, S603, S605, and S607, the step S603 of determining whether the extracted significant figures are identical to each other may be performed first, and then the step S601 of determining whether responses have been received within the response time limit may be performed.

The above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as Compact Disk Read-Only Memory (CD-ROM) and a Digital Versatile Disk (DVD), magneto-optical media, such as a floptical disk, ROM, Random Access Memory (RAM), and flash memory. Examples of the program instructions include machine language code, such as code created by a compiler, and high-level language code executable by a computer using an interpreter. The hardware devices may be configured to operate as one or more software modules in order to perform the operation of the present invention, and vice versa.

Specific executions, described in the present invention, are only embodiments, and are not intended to limit the scope of the present invention using any methods. For the simplification of the present specification, a description of conventional electronic components, control systems, software, and other functional aspects of the systems may be omitted. Further, connections of lines between components shown in the drawings or connecting elements therefor illustratively show functional connections and/or physical or circuit connections. In actual devices, the connections may be represented by replaceable or additional various functional connections, physical connections or circuit connections. Further, unless a definite expression, such as "essential" or "importantly" is specifically used in context, the corresponding component may not be an essential component for the application of the present invention.

In accordance with the present invention, the fixed-location IoT device and method for protecting access information for secure storage in an IoT environment may securely protect sensitive information stored in IoT devices by protecting access information for secure storage for protecting sensitive information using the information corresponding to neighboring fixed-location IoT devices.

Therefore, the spirit of the present invention should not be defined by the above-described embodiments, and it will be apparent that the accompanying claims and equivalents thereof are included in the scope of the spirit of the present invention.

What is claimed is:

1. A fixed-location Internet of Things (IoT) device for protecting secure storage access information, comprising:
   a unique hardware information analysis unit for generating a hardware hash value by analyzing unique hardware information corresponding to the fixed-location IoT device for protecting the secure storage access information;

a network environment information collection unit for collecting network environment information from one or more neighboring fixed-location IoT devices, the network environment information including respective identification information for the one or more neighboring fixed-location IoT devices and a respective one or more response times corresponding to the respective identification information;

a network environment information analysis unit for generating a network hash value by analyzing the one or more of response times included in the network environment information;

an access information encryption key generation unit for generating an access information encryption key corresponding to the secure storage access information using the hardware hash value and the network hash value; and an encryption/decryption unit for encrypting or decrypting the secure storage access information using the access information encryption key.

2. The fixed-location IoT device of claim 1, wherein when the boot state is an initial boot:

the network environment information is initial network environment information, the network environment information collection unit is configured to collect the initial network environment information using a preset first number of collections, the network environment information analysis unit is configured to generate the network hash value by analyzing the initial network environment information, and the encryption/decryption unit is configured to encrypt the secure storage access information using the access information encryption key.

3. The fixed-location IoT device of claim 2, wherein when the boot state is not the initial boot:

the network environment information is reboot network environment information, the network environment information collection unit is configured to collect the reboot network environment information from the one or more neighboring fixed-location IoT devices a number of times identical to a preset second number of collections, the network environment information analysis unit is configured to analyze the reboot network environment information, generate the network hash value when results of analysis of the reboot network environment information satisfy a preset analysis condition, and re-collect the reboot network environment information within a range of a preset allowable number of analysis failures when the results of analysis of the reboot network environment information do not satisfy the preset analysis condition, and the encryption/decryption unit is configured to, when the results of analysis of the reboot network environment information satisfy the preset analysis condition, decrypt the secure storage access information using the access information encryption key.

4. The fixed-location IoT device of claim 3, wherein the network environment information collection unit is configured to, when collecting the network environment information, transmit a respective speed measurement command to the one or more neighboring fixed-location IoT devices and acquire the respective identification information and the respective one or more response times from received response messages.

5. The fixed-location IoT device of claim 4, wherein the network environment information collection unit deletes the initial network environment information and the reboot network environment information, except for preset deletion-exception items.

6. The fixed-location IoT device of claim 5, wherein the network environment information analysis unit extracts significant figures and significant digits from the response times corresponding to the respective identification information and generates the network hash value using the significant figures.

7. The fixed-location IoT device of claim 6, wherein the preset deletion-exception items comprise the identification information and the significant digits.

8. The fixed-location IoT device of claim 7, wherein the preset analysis condition comprises a condition of comparing significant figures, extracted depending on the significant digits, from the response times corresponding to the respective identification information in the reboot network environment information.

9. The fixed-location IoT device of claim 1, wherein the unique hardware information comprises serial numbers of hardware components included in the fixed-location IoT device for protecting the secure storage access information.

10. The fixed-location IoT device of claim 3, wherein when the boot state is not the initial boot, only response times for neighboring fixed-location IoT devices having identification information included in the initial network environment information are collected by the network environment information collection unit.

11. A method for protecting secure storage access information of a fixed-location IoT device, comprising:

generating a hardware hash value by analyzing unique hardware information corresponding to a target fixed-location IoT device including secure storage; and when a boot state is an initial boot;

collecting initial network environment information from neighboring fixed-location IoT devices a number times corresponding to a preset first number of collections;

generating a network hash value by analyzing one or more response times included in the initial network environment information;

generating an access information encryption key corresponding to secure storage access information using the hardware hash value and the network hash value; and encrypting the secure storage access information using the access information encryption key.

12. The method of claim 11, further comprising:

when the boot state is not the initial boot:

collecting reboot network environment information from the neighboring fixed-location IoT devices a number of times identical to a preset second number of collections;

analyzing the reboot network environment information;

generating the network hash value by analyzing one or more response times included in the reboot network environment information when results of analysis of the reboot network environment information satisfy a preset analysis condition;

generating the access information encryption key using the hardware hash value and the network hash value; and decrypting the secure storage access information using the access information encryption key when the results of analysis of the reboot network environment information satisfy the preset analysis condition, wherein when the reboot network environment information is analyzed and the results of analysis of the reboot network environment information do not satisfy the preset analysis condition, repeating collecting the reboot network environment information within a range of a preset allowable number of analysis failures.

13. The method of claim 12, wherein:

collecting the initial network environment information is configured to transmit a speed measurement command to the neighboring fixed-location IoT devices and acquire identification information and response times corresponding to the respective neighboring fixed-location IoT devices from received response messages, and collecting the reboot network environment information is configured to transmit a speed measurement command to the neighboring fixed-location IoT devices and acquire identification information and response times corresponding to the respective neighboring fixed-location IoT devices from received response messages.

14. The method of claim 13, further comprising deleting the initial network environment information and the reboot network environment information, except for preset deletion-exception items.

15. The method of claim 14, wherein when the boot state is the initial boot, generating the network hash value is configured to extract significant figures and significant digits from the response times included in the initial network environment information corresponding to the respective identification information and generate the network hash value using the significant figures, and when the boot state is not the initial boot, generating the network hash value is configured to extract significant digits from the response times included in reboot network environment information, the response times corresponding to the respective identification information, and generate the network hash value using the significant figures.

16. The method of claim 15, wherein the preset deletion-exception items comprise the identification information and the significant digits.

17. The method of claim 16, wherein the preset analysis condition comprises a condition of comparing significant figures, extracted depending on the significant digits, from the response times corresponding to the respective identification information in the reboot network environment information.

18. The method of claim 17, wherein the unique hardware information comprises serial numbers of hardware components included in the target fixed-location IoT device.

19. The method of claim 12, wherein when the boot state is not the initial boot, only response times for neighboring fixed-location IoT devices having identification information included in the initial network environment information are collected.

* * * * *